(12) United States Patent
Choi et al.

(10) Patent No.: US 9,323,017 B2
(45) Date of Patent: Apr. 26, 2016

(54) OPTICAL MODULE, AND OPTICAL PRINTED CIRCUIT BOARD AND METHOD OF MANUFACTURING THE SAME

(75) Inventors: Jae Bong Choi, Seoul (KR); Joon Wook Han, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 732 days.

(21) Appl. No.: 13/144,960

(22) PCT Filed: Nov. 26, 2009

(86) PCT No.: PCT/KR2009/007018
§ 371 (c)(1),
(2), (4) Date: Sep. 20, 2011

(87) PCT Pub. No.: WO2010/082725
PCT Pub. Date: Jul. 22, 2010

(65) Prior Publication Data
US 2012/0002916 A1    Jan. 5, 2012

(30) Foreign Application Priority Data
Jan. 16, 2009   (KR) .................. 10-2009-0003715

(51) Int. Cl.
*G02B 6/12* (2006.01)
*G02B 6/43* (2006.01)
(Continued)

(52) U.S. Cl.
CPC ............... *G02B 6/43* (2013.01); *G02B 6/3608* (2013.01); *G02B 6/4214* (2013.01); *G02B 6/4292* (2013.01)

(58) Field of Classification Search
CPC .................................................. G02B 6/3608
See application file for complete search history.

(56) References Cited

U.S. PATENT DOCUMENTS 3,699,950 A * 10/1972 Humphrey et al. ........... 600/249
4,537,469 A *  8/1985 Kircher ............................ 385/13
5,233,677 A *  8/1993 Winslow .......................... 385/89
(Continued)

FOREIGN PATENT DOCUMENTS

CN        101344624 A    1/2009
JP        09-005581 A    1/1997
(Continued)

OTHER PUBLICATIONS

Office Action dated Jun. 20, 2013 in Chinese Application No. 200980154877.3, filed Nov. 26, 2009.
(Continued)

*Primary Examiner* — Uyen Chau N Le
*Assistant Examiner* — Chad Smith
(74) *Attorney, Agent, or Firm* — Saliwanchik, Lloyd & Eisenschenk

(57) ABSTRACT

Provided are an optical module, and an optical printed circuit board and a method of manufacturing the same. The optical module includes an optical fiber, a first ferrule coupled to one end of the optical fiber, and a second ferrule coupled to the other end of the optical fiber. The optical printed circuit board includes a first board, an optical transmitter module and an optical receiver module, which are disposed on the first board, an optical fiber passing through the first board, the optical fiber extending integrally from a lower side of the optical transmitter module to a lower side of the optical receiver module, first and second ferrules coupled to one end and the other end of the optical fiber, respectively, the first and second ferrules being supported by the first board, and a second board through which the optical fiber passes, the second board being disposed below the first board.

13 Claims, 2 Drawing Sheets

(51) Int. Cl.
*G02B 6/36* (2006.01)
*G02B 6/42* (2006.01)

(56) References Cited

U.S. PATENT DOCUMENTS

| | | | |
|---|---|---|---|
| 5,283,851 A * | 2/1994 | Vergnolle | 385/134 |
| 6,259,840 B1 | 7/2001 | Munoz-Bustamante et al. | |
| 6,330,377 B1 * | 12/2001 | Kosemura | 385/14 |
| 2003/0202760 A1 | 10/2003 | Henze et al. | |
| 2005/0002618 A1 | 1/2005 | Miyamae et al. | |
| 2005/0106368 A1 | 5/2005 | Ha et al. | |
| 2006/0115277 A1 | 6/2006 | Yamada et al. | |
| 2007/0025079 A1 * | 2/2007 | Salmon | 361/688 |
| 2008/0187276 A1 * | 8/2008 | Roberts et al. | 385/114 |
| 2009/0214158 A1 * | 8/2009 | Lee et al. | 385/14 |

FOREIGN PATENT DOCUMENTS

| | | |
|---|---|---|
| JP | 11-119033 A | 4/1999 |
| JP | 2000-340907 A | 12/2000 |
| JP | 2001-249251 A | 9/2001 |
| JP | 2001-305352 A | 10/2001 |
| JP | 2003-185890 A | 7/2003 |
| JP | 2005-150671 A | 6/2005 |
| JP | 2005-316266 A | 11/2005 |
| JP | 2006-154659 A | 6/2006 |
| JP | 2009-133908 A | 6/2009 |
| KR | 10-2005-0040589 A | 5/2005 |
| KR | 10-2006-0017053 A | 2/2006 |
| KR | 10-2007-0071454 A | 7/2007 |
| KR | 10-2009-0092204 A | 8/2009 |

OTHER PUBLICATIONS

Office Action dated Oct. 19, 2012 in Chinese Application No. 200980154877.3, filed Nov. 26, 2009.
Notice of Allowance dated Oct. 28, 2011 in Korean Application No. 10-2009-0003715, filed Jan. 16, 2009.
Office Action dated Apr. 23, 2013 in Japanese Application No. 2011-546204, filed Nov. 26, 2009.
Office Action dated Feb. 4, 2014 in Japanese Application No. 2011-546204.
Office Action dated Jun. 5, 2014 in Taiwanese Application No. 098145502.

* cited by examiner

OPTICAL MODULE, AND OPTICAL PRINTED CIRCUIT BOARD AND METHOD OF MANUFACTURING THE SAME

CROSS-REFERENCE TO RELATED APPLICATIONS

This application is the U.S. national stage application of International Patent Application No. PCT/KR2009/007018, filed Nov. 26, 2009, which claims priority to Korean Application No. 10-2009-0003715, filed Jan. 16, 2009, the disclosures of each of which are incorporated herein by reference in their entirety.

TECHNICAL FIELD

Embodiments relate to an optical module, and an optical printed circuit board and a method of manufacturing the same.

BACKGROUND ART

A large number of various components of printed circuit boards (PCBs) are mounted on a flat plate formed of a phenol or epoxy resin. Circuitries connecting the components to each other are closely fixed to a surface of the flat plate to form a circuit board.

In such a PCB, after a thin film formed of copper or the like is attached to a surface of a resin insulation plate, the resin insulation plate including the thin film is etched according to a wiring pattern of a circuit to obtain a desired circuit. Afterward, holes are bored for mounting components.

The PCB is classified into a single-sided board, a double-sided board, and a multilayered board depending on the number of wiring circuit board surfaces. As the number of layers is increased, the ability to mount components increases and more highly precise products can be realized.

An electro-optical circuit board (ECOB), in which optical waveguides that can transmit and receive optical signals using a polymer and a glass fiber are inserted into the PCB has been developed now.

According to a related art ECOB, an optical via hole is bored in an optical PCB in which optical waveguides are buried to insert an optical connection rod in which a reflection mirror is inclined at an angle of about 45° or an optical connection block in which a glass fiber is bent at an angle of about 90° into the optical via hole.

However, in the related art ECOB, it is difficult to precisely align the optical waveguides with the optical connection rod/optical connection block in vertical and horizontal directions and in left and right directions.

In addition, there are limitations that a plurality of layers should be stacked, and a drilling process should be required so as to insert the optical waveguide into the circuit board.

DISCLOSURE

Technical Problem

Embodiments provide an optical module having a novel structure, and an optical PCB and a method of manufacturing the optical PCB.

Embodiments also provide an optical module in which optical devices are easily aligned with each other, and an optical PCB and a method of manufacturing the optical PCB.

Embodiments also provide an optical PCB in which a manufacturing process is simplified, and a method of manufacturing the optical PCB.

Technical Solution

In one embodiment, an optical module includes: an optical fiber; a first ferrule coupled to one end of the optical fiber; and a second ferrule coupled to the other end of the optical fiber.

In another embodiment, an optical printed circuit board includes: a first board; an optical transmitter module and an optical receiver module, which are disposed on the first board; an optical fiber passing through the first board, the optical fiber extending integrally from a lower side of the optical transmitter module to a lower side of the optical receiver module; first and second ferrules coupled to one end and the other end of the optical fiber, respectively, the first and second ferrules being supported by the first board; and a second board through which the optical fiber passes, the second board being disposed below the first board.

In further another embodiment, a method of manufacturing an optical printed circuit board includes: preparing an optical module in which a first ferrule and a second ferrule are respectively coupled to both ends of an optical fiber; forming first and second ferrule installation portions passing through a first board in the first board; inserting the first and second ferrules into the first and second ferrule installation portions, respectively; heating and compressing the first board and a second board to attach the first and second boards to each other such that the optical fiber is buried into the second board; and disposing an optical transmitter module on the first board to face the first ferrule, and disposing an optical receiver module on the first board to face the second ferrule.

The details of one or more embodiments are set forth in the accompanying drawings and the description below. Other features will be apparent from the description and drawings, and from the claims.

Advantageous Effects

Embodiments may provide the optical module having a novel structure, and the optical PCB and the method of manufacturing the optical PCB.

Embodiments may provide the optical module in which the optical devices are easily aligned with each other, and the optical PCB and the method of manufacturing the optical PCB.

Embodiments may provide the optical PCB in which the manufacturing process is simplified, and the method of manufacturing the optical PCB.

MODE FOR INVENTION

Figure 1:
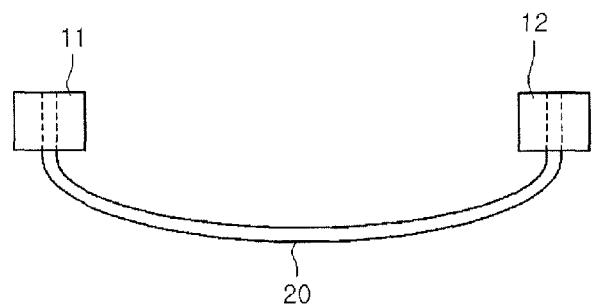
FIG. 1 is a view of an optical module according to an embodiment.

In the description of embodiments, it will be understood that when a layer (or film), region, pattern or structure is referred to as being 'on' another layer (or film), region, pad or pattern, the terminology of 'on' and 'under' includes both the meanings of 'directly' and 'indirectly'. In addition, it will also be understood that when a layer is referred to as being 'between' two layers, it can be the only layer between the two layers, or one or more intervening layers may also be present. Further, the reference about 'on' and 'under' each layer will be made on the basis of drawings.

In the drawings, the thickness or size of each layer is exaggerated, omitted, or schematically illustrated for convenience in description and clarity. Also, the size of each element does not entirely reflect an actual size.

Hereinafter, an optical module, and an optical printed circuit board and a method of manufacturing the same according to an embodiment will described in detail with reference to the accompanying drawings.

FIG. 1 is a view of an optical module according to an embodiment.

Referring to FIG. 1, an optical module includes an optical fiber 20, and first and second ferrules 11 and 12, which are coupled to both ends of the optical fiber 20.

The optical fiber 20 transmits an optical signal. The first and second ferrules 11 and 12 are disposed on both ends of the optical fiber 20 to facilitate a position alignment of the optical fiber 20.

Although one optical fiber 20 is illustrated in this embodiment, the optical fiber 20 may be provided in plurality. The plurality of optical fibers 20 may be coupled to the first and second ferrules 11 and 12.

In the optical module according to an embodiment, the optical signal is applied to a portion of the optical fiber 20 to which the first ferrule 11 is coupled, and the optical signal is outputted from a portion of the optical fiber 20 to which the second ferrule 12 is coupled.

According to a related art optical module, a linear-shaped optical waveguide buried in a printed circuit board (PCB) is provided. In addition, an optical connection rod including a reflection mirror or an optical connection block including a bent optical waveguide are aligned on one side of the optical waveguide to transmit an optical signal applied in a direction perpendicular to that of the optical waveguide into the optical waveguide. Also, the optical connection rod including the reflection mirror or the optical connection block including the bent optical waveguide are aligned on the other side of the optical waveguide to output an optical signal from the optical waveguide in a direction perpendicular to that of the optical waveguide. However, the optical module according to an embodiment, the optical fiber 20 may serve as the optical waveguide, the optical connection rod, and the optical connection block.

The optical fiber 20 transmits the optical signal through first surfaces of the first and second ferrules 11 and 12 and second surfaces opposite to the first surfaces. That is, the optical fiber 20 has a linear shape within the first and second ferrules 11 and 12 and is disposed parallel to lateral surfaces of the first and second ferrules 11 and 12.

FIGS. 2 to 7 are views illustrating an optical PCB and a process of manufacturing the optical PCB according to an embodiment.

Figure 2:
FIGS. 2 to 7 are views illustrating an optical printed circuit board (PCB) and a process of manufacturing the optical PCB according to an embodiment.

Referring to FIG. 2, a first board 30 is prepared. The first board 30 may be a copper foil laminated plate on which copper foils are formed on both surfaces of an insulation member. A plurality of circuit patterns (not shown) and/or a conductive via (not shown) may be formed in the first board 20.

Figure 3:
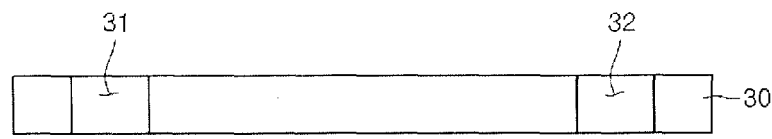

Referring to FIG. 3, a drilling process is performed on the first board 30 to form a first ferrule installation portion 31 and a second ferrule installation portion 32.

Figure 4:
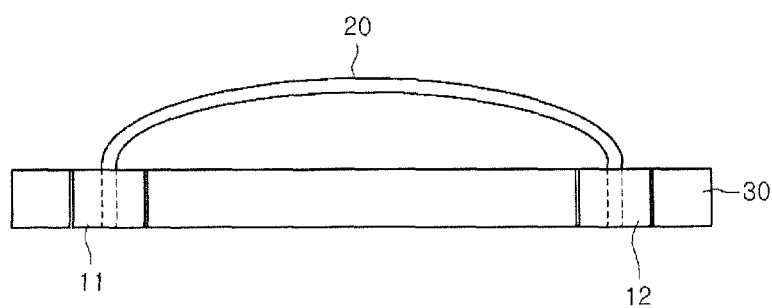

Referring to FIG. 4, a first ferrule 11 and a second ferrule 12 are inserted into the first ferrule installation portion 31 and the second ferrule installation portion 32, respectively.

Figure 5:
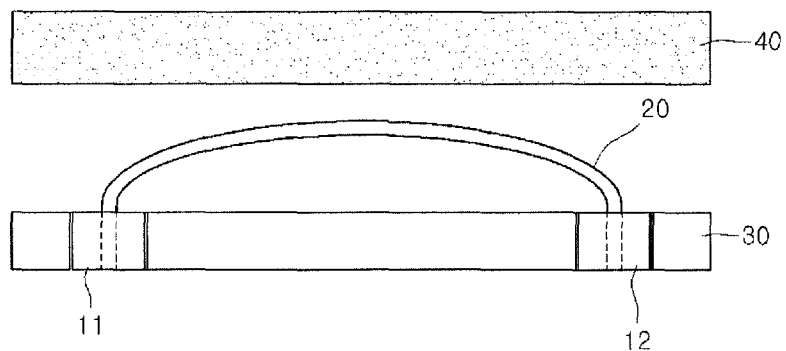

Referring to FIG. 5, a second board 40 is disposed on the first board 30. The second board 40 is compressed to attach the second board 40 to the first board 30.

A board that is in a semi-fluid state may be used as the second board 40. For example, a prepreg may be used as the second board 40.

Figure 6:
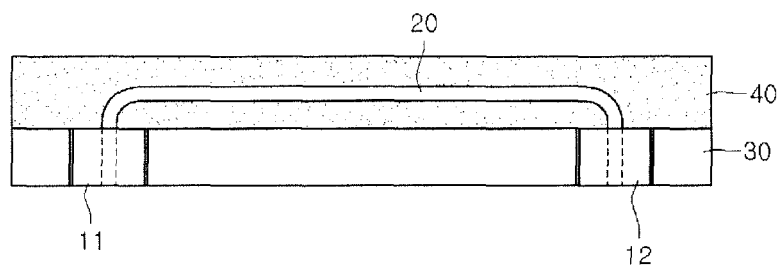

Referring to FIG. 6, since the second board 40 is in the semi-fluid state, an optical fiber 20 is bent by the second board 40 when the second board 40 is compressed.

Also, the optical fiber 20 is buried within the second board 40. Portions of the optical fiber 20 disposed within the first and second ferrules 11 and 12 are disposed perpendicular to a principal surface of the first board 30.

Although not shown, a circuit pattern or a conductive via may be formed on/in the second board 40.

Figure 7:
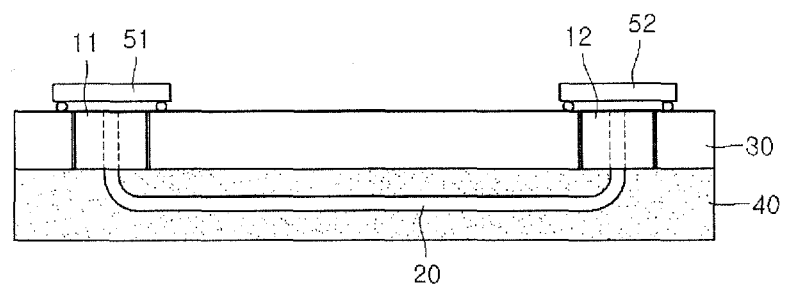

Referring to FIG. 7, an optical transmitter module 51 is disposed at a position facing the first ferrule 11, and an optical receiver module 52 is disposed at a position facing the second ferrule 12.

For example, the optical transmitter module 51 may include a vertical-cavity surface-emitting laser (VCSEL), and the optical receiver module 52 may include a photodiode.

Referring FIG. 7, in the optical PCB according to an embodiment, the optical fiber 20 integrally extends from a lower side of the optical transmitter module 51 up to the optical receiver module 52.

At least portions of the first and second ferrules 11 and 12 flush with the first board 30, and a portion of the optical fiber 20 is disposed below the first board 30.

A portion of the optical fiber 20 is disposed parallel to a virtual-straight line connecting the optical transmitter module 51 to the optical receiver module 52. A portion of the optical fiber 20 is disposed perpendicular to the virtual-straight line connecting the optical transmitter module 51 to the optical receiver module 52.

As described above, in the optical PCB according to an embodiment, when an optical signal is applied to the optical transmitter module 51, the optical signal is inputted into the optical fiber 20 disposed below the optical transmitter module 51, and the optical signal is outputted to the optical receiver module 52 through the optical fiber 20 disposed below the optical transmitter module 51.

As described above, since the optical fiber 20 is integrally formed from a lower end of the optical transmitter module 51 to a lower end of the optical receiver module 52, a precisely alignment is not required, and also, a manufacturing process is simplified.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

INDUSTRIAL APPLICABILITY

Embodiments may be applicable to a light emitting device used as a light source.

The invention claimed is:

1. An optical module comprising:
an optical fiber passing through a first board and a second board disposed below the first board of an optical printed circuit board, and buried into the second board;
a first ferrule that securely surrounds one end of the optical fiber, fixing the one end of the optical fiber; and
a second ferrule that securely surrounds the other end of the optical fiber, fixing the other end of the optical fiber;

wherein the first and the second ferrules are detachably inserted into the first board of the optical printed circuit board to pass through the first board;

wherein a top surface of the first ferrule lies in a same plane as that of a top surface of the first board, and a bottom surface of the first ferrule lies in a same plane as that of a bottom surface of the first board;

wherein a top surface of the second ferrule lies in a same plane as that of the top surface of the first board, and a bottom surface of the second ferrule lies in a same plane as that of the bottom surface of the first board;

wherein the top surfaces of the first and second ferrules are exposed through the top surface of the first board, and the bottom surfaces of the first and second ferrules are exposed through the bottom surface of the first board;

wherein the optical fiber includes a first portion inserted into the first board and a second portion buried into the second board; wherein the second portion is surrounded by the second board and wherein a thickness of the first ferrule is same as a thickness of the first board of the optical printed circuit board, and a thickness of the second ferrule is same as the thickness of the first board of the optical printed circuit board.

2. The optical module according to claim 1, wherein a bent degree of the optical fiber is changed according to a change of a distance between the first ferrule and the second ferrule.

3. The optical module according to claim 1, wherein the first portion of the optical fiber passes through first surfaces of the first and second ferrules and meets second surfaces of the first and second ferrules that are respectively opposite to the first surfaces.

4. The optical module according to claim 1, wherein the first portion of the optical fiber is disposed in a linear shape within the first and second ferrules.

5. The optical module according to claim 4, wherein the first portion of the optical fiber is disposed parallel to lateral surfaces of the first and second ferrules and is disposed within the first and second ferrules.

6. The optical module according to claim 1, wherein the first and second ferrules are supported by the first board.

7. The optical module according to claim 1, wherein the second board is a prepreg having a semi-fluid state.

8. An optical printed circuit board comprising:
a first board and a second board disposed below the first board;
an optical transmitter module and an optical receiver module, both disposed on the first board;
an optical fiber passing through the first board and the second board, extending integrally from a lower side of the optical transmitter module to a lower side of the optical receiver module, and buried into the second board; and first and second ferrules securely surrounding one end and the other end of the optical fiber, respectively, fixing the two ends of the optical fiber, the first and second ferrules detachably inserted into the first board to pass through the first board;

wherein a top surface of the first ferrule lies in a same plane as that of a top surface of the first board, and a bottom surface of the first ferrule lies in a same plane as that of a bottom surface of the first board;

wherein a top surface of the second ferrule lies in a same plane as that of the top surface of the first board, and a bottom surface of the second ferrule lies in a same plane as that of the bottom surface of the first board;

wherein the top surfaces of the first and second ferrules are exposed through the top surface of the first board, and the bottom surfaces of the first and second ferrules are exposed through the bottom surface of the first board;

wherein the optical fiber includes a first portion inserted into the first board and a second portion buried into the second board; wherein the second portion is surrounded by the second board and wherein a thickness of the first ferrule is same as a thickness of the first board of the optical printed circuit board, and a thickness of the second ferrule is same as the thickness of the first board of the optical printed circuit board.

9. The optical printed circuit board according to claim 8, wherein the first portion of the optical fiber passes through first surfaces of the first and second ferrules, respectively.

10. The optical printed circuit board according to claim 8, wherein the first portion of the optical fiber is disposed in a linear shape within the first and second ferrules.

11. The optical printed circuit board according to claim 8, wherein the first portion of the optical fiber is disposed perpendicular to a principal surface of the first board within the first and second ferrules.

12. The optical printed circuit board according to claim 8, wherein at least the second portion of the optical fiber is disposed parallel to a virtual-straight line connecting the optical transmitter module to the optical receiver module within the second board.

13. The optical printed circuit board according to claim 8, wherein the second board is a prepreg having a semi-fluid state.

* * * * *